(12) United States Patent
Russell et al.

(10) Patent No.: US 8,186,601 B2
(45) Date of Patent: May 29, 2012

(54) NON-VOLATILE MEMORY CHARGE PUMP FOR RADIO FREQUENCY IDENTIFICATION (RFID) SYSTEM

(75) Inventors: Daniel J. Russell, Monument, CO (US);
Albert S. Weiner, Colorado Springs, CO (US); Jeffrey S. Hapke, Monument, CO (US); Michael Klein, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 424 days.

(21) Appl. No.: 12/477,087

(22) Filed: Jun. 2, 2009

(65) Prior Publication Data

US 2010/0301122 A1 Dec. 2, 2010

(51) Int. Cl.
*G06K 19/06* (2006.01)
(52) U.S. Cl. ............ 235/492; 235/380; 235/451
(58) Field of Classification Search .......... 235/492, 235/380, 451, 375; 340/10.51, 10.5; 365/192, 365/191, 228
See application file for complete search history.

(56) References Cited

U.S. PATENT DOCUMENTS

| 6,134,130 | A  | * | 10/2000 | Connell et al. | 363/89 |
| 6,515,919 | B1 | * | 2/2003  | Lee | 365/192 |
| 7,158,009 | B2 | * | 1/2007  | Watanabe | 340/10.34 |
| 2005/0133605 | A1 | * | 6/2005 | Koyama et al. | 235/492 |
| 2006/0197668 | A1 | * | 9/2006 | Oliver et al. | 340/572.4 |
| 2007/0087719 | A1 | * | 4/2007 | Mandal et al. | 455/299 |

* cited by examiner

*Primary Examiner* — Edwyn Labaze
(74) *Attorney, Agent, or Firm* — Fish & Richardson P.C.

(57) ABSTRACT

A charge pump is incorporated into circuitry of an RFID tag. The charge pump takes advantage of an antenna voltage phase to eliminate the need for a charge pump clock generator. Placement of the charge pump in the RFID circuitry reduces the number of pump stages and eliminates drivers used in each pump stage. In some implementations, an RFID tag comprises antenna circuitry, including a tuned antenna, for receiving an RF signal. Voltage conversion circuitry in the RFID tag is coupled to the antenna circuitry and operable for converting a varying magnetic field produced in the antenna to a voltage source. A charge pump is coupled to output voltage signals of the antenna circuitry which provide the charge pump with a high starting reference voltage and a two phase pump clock.

8 Claims, 6 Drawing Sheets

NON-VOLATILE MEMORY CHARGE PUMP FOR RADIO FREQUENCY IDENTIFICATION (RFID) SYSTEM

TECHNICAL FIELD

This subject matter is generally related to high voltage charge pumps for non-volatile memory.

BACKGROUND

A Radio Frequency (RF) Identification (RFID) system generally includes a reader and an RFID tag. The reader generates a magnetic field to power the RFID tag, usually at frequency of 13.56 MHz or 125 kHz. An RFID antenna is inductively coupled to the reader antenna. The RFID tag contains a power rectifier to convert the varying magnetic field received through the antenna to a Direct Current (DC) voltage source that powers the RFID tag. The rectified voltage signal may be further regulated to a lower voltage (e.g., around 1.8 to 2.4V) to power digital circuits required for RFID tag operation.

Some RFID tags require nonvolatile memory, usually an EEPROM array. The EEPROM array interfaces to the digital circuits and typically shares the same voltage supply. The EEPROM array requires a charge pump to generate a high voltage DC level for programming EEPROM memory cells.

There are many conventional charge pump designs that can generate high voltage from a low voltage DC source. These conventional charge pumps, however, are inefficient at lower source voltages. Accordingly, an EEPROM program operation is often the most power consuming task for RFID tags due to the inefficient charge pumps.

Conventional charge pumps for nonvolatile memories use internal chip voltage and internally generated clock signals to produce high voltage. As technologies evolved, the internal chip voltages have been steadily lowered. Because the high voltage required for nonvolatile memory programming has not scaled proportionately, the size and power requirements of the charge pump have increased. This problem is compounded on RFID products because increased power requirements can reduce the RFID tag operating range. When the charge pump is turned on in a weak RF field, the internal voltage may collapse, causing an illegal write, or the sudden increase in current load may interfere with normal RFID communications.

SUMMARY

A charge pump is incorporated into circuitry of an RFID tag. The charge pump takes advantage of an antenna voltage phase to eliminate the need for a charge pump clock generator. Placement of the charge pump in the RFID circuitry reduces the number of pump stages and eliminates drivers used in each pump stage.

In some implementations, an RFID tag comprises antenna circuitry, including a tuned antenna, for receiving an RF signal. Voltage conversion circuitry in the RFID tag is coupled to the antenna circuitry and operable for converting a varying magnetic field induced in the antenna to a voltage source. A charge pump is coupled to the voltage signals of the antenna circuitry which provide the charge pump with a high starting reference voltage and a two phase pump clock. The charge pump output can be coupled to the voltage source to help keep the load constant, and to increase efficiency by using the charge pump output to help power the RFID tag.

Some advantages that result from incorporating a charge pump in RFID tag circuitry include increased operational range and reduced die area (reduced cost). A reduced die area and reduced current result from the elimination of clock generators, drivers in pump stages and using fewer pump stages. The unique phase relation provided by a full wave rectifier in the RFID tag allows use of a higher dynamic starting voltage, which in turn, allows for a reduced number of pump stages. The charge pump allows the RFID tag to operate over an increased operating range (e.g., allows for a longer distance from a reader) due to the reduced current used in the RFID tag. The charge pump voltage does not depend on a digital supply voltage, which permits continued voltage scaling for further current reduction in the RFID system.

DETAILED DESCRIPTION

Figure 1:
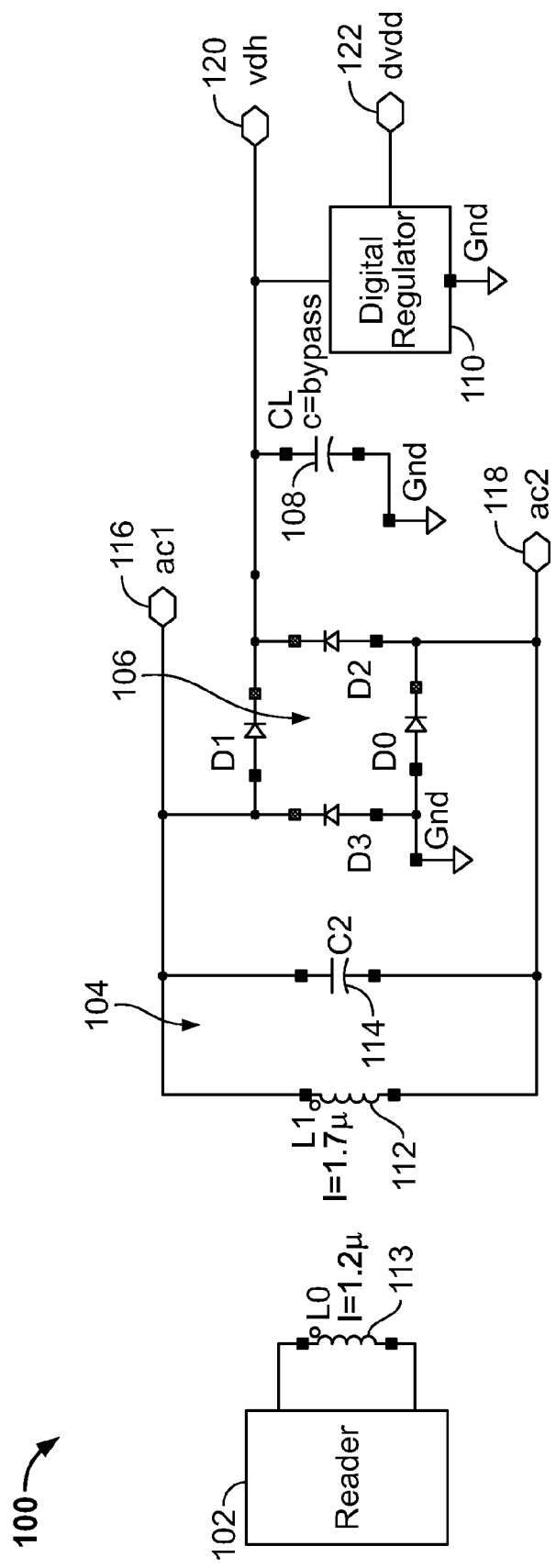
FIG. 1 is a schematic diagram of an example RFID tag circuitry.

FIG. 1 is a schematic diagram of an example RFID tag circuitry 100 (referred to as "RFID tag 100"). Although the disclosed charge pump design is described herein as incorporated in an RFID tag, the design is applicable to any system that includes an antenna for receiving RF signals that can be used to power and clock a charge pump.

In some implementations, RFID tag 100 includes tuned antenna circuitry 104, full wave bridge rectifier circuitry 106, bypass capacitor 108 and digital power regulator 110. Rails 116, 118 provide voltage signals ac1, ac2. Rail 120 provides a voltage source for use by analog circuits in RFID tag 100. Rail 122 provides a regulated voltage source generated by digital power regulator 110 for use by digital circuits in RFID tag 100.

RFID tag 100 communicates with reader 102. Reader 102 generates a magnetic field (e.g., at 13.56 MHz) to power RFID tag 100. Tag antenna 112 is magnetically coupled to reader antenna 113. Capacitor 114, when combined with tag antenna 112 (an inductor), forms a "tank" circuit that can be tuned to a desired frequency range using well known electronic principles.

RFID tag 100 contains circuitry to convert a varying magnetic field received through tag antenna 112 to a Direct Current (DC) voltage source that powers RFID tag 100. Full wave bridge rectifier circuitry 106 and bypass capacitor 108 are used together to convert the coupled energy to a stable voltage signal. The combination of full wave, bridge rectifier circuitry 106 and bypass capacitor 108 is referred to herein as "voltage conversion circuitry." The voltage signal output by the full wave, bridge rectifier 106 can be further regulated by digital regulator 110 to a lower voltage (e.g., around 1.8 to 2.4V) to power digital circuits in RFID tag 100.

Example RFID Voltage Conversion

The voltage conversion circuitry shown in FIG. 1 is formed by full wave bridge rectifier circuitry 106 (diodes D0-D3), bypass capacitor 108 ("CL"), and the tuned antenna circuitry 104 (antenna 112 (L1) coupled in parallel with capacitor 114 (C2)). The voltage conversion circuitry generates analog rectified voltage source, vdh, which can be further regulated by digital power regulator 110 to provide regulated digital voltage source, dvdd. The operation of voltage conversion circuitry in RFID tag 100 is well known and will not be described in further detail.

Figure 2:
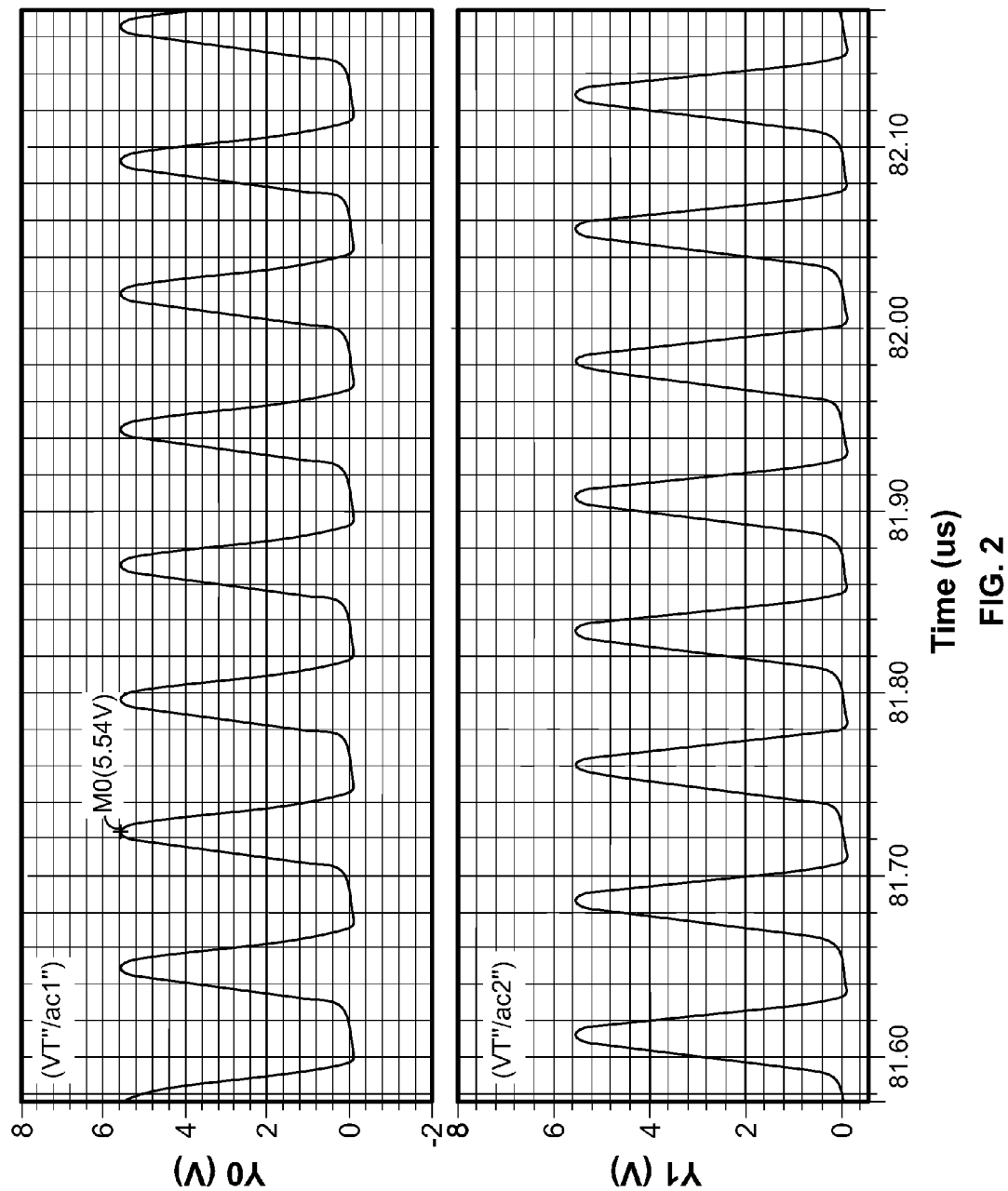
FIG. 2 shows plots illustrating voltage signals ac1, ac2 received from the output of antenna circuitry in RFID tag circuitry of FIG. 1.

FIG. 2 shows plots illustrating voltage signals ac1, ac2, received from the output of antenna circuitry 104 of FIG. 1. As shown in FIG. 2, the signal ac1 (upper plot) and ac2 (lower plot), are full rectified and 180 degrees out of phase. As will be described in reference to FIGS. 3A and 4, the voltage signals ac1, ac2, provide a high starting voltage and a two phase clock for the charge pump. The high starting voltage and two phase clock eliminates the need for a clock generator, and reduces the number of pump stages or drivers used in pump stages. For example, the voltage signals ac1, ac2, are the highest voltage signals (excluding charge pump voltages) on the RFID tag 100. These signals serve as the starting voltage for the charge pump. These voltages may be about 5V, relative to the 1.8V to 2.4V levels typically used in the digital portion of the tag.

In conventional RFID tags, a clock generator is often included in the charge pump circuitry to generate a clock for use in timing the switching of pump capacitors to sum voltages stored on the pump capacitors. Using voltage signals ac1, ac2, as a clock source eliminates the need for clock generator circuitry which consumes power. The reduction of pump stages and drivers also reduces power consumption. By reducing the power consumed by the RFID tag 100, the operating range of the RFID tag 100 can be increased.

RFID Charge Pump Architecture Comparison

Figure 3A:
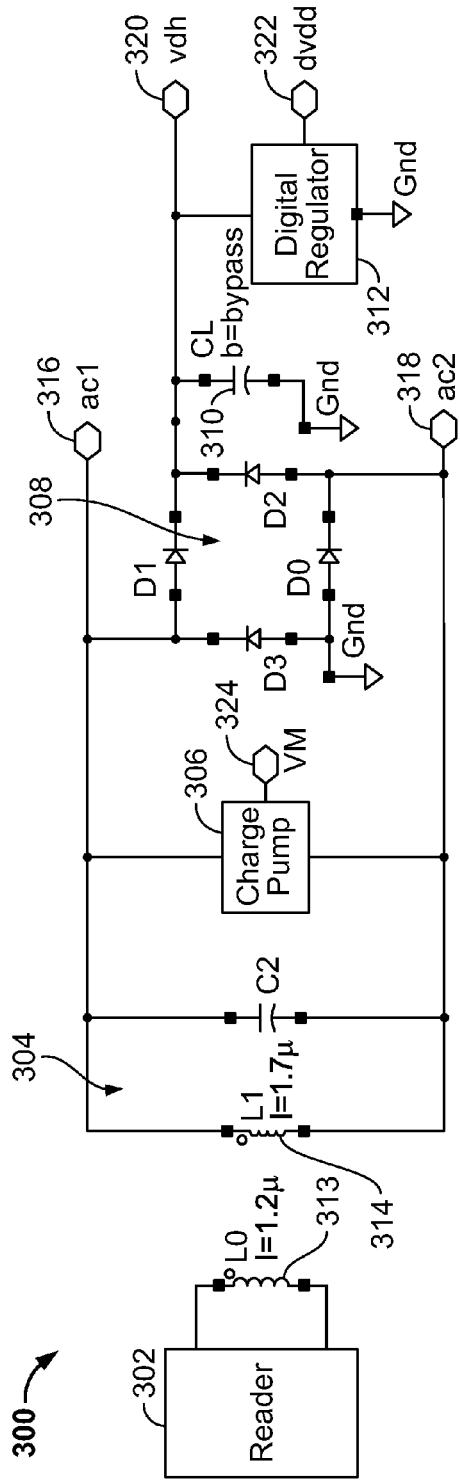
FIG. 3A is a schematic diagram of an example RFID tag, including an incorporated charge pump.
Figure 3B:
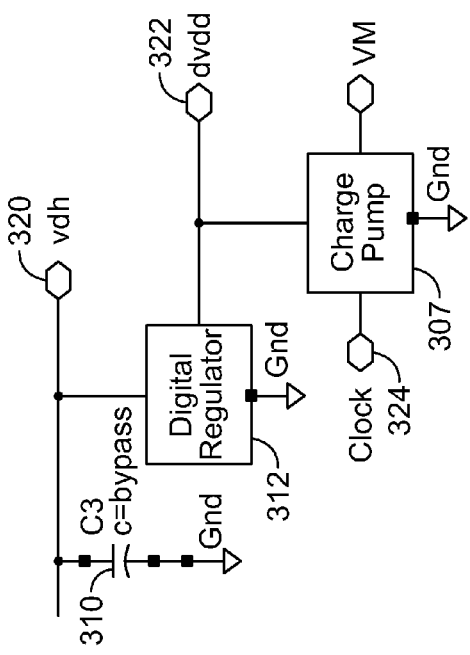
FIG. 3B is schematic diagram of an example conventional charge pump circuit configuration.

FIG. 3A is a schematic diagram of an example RFID tag 300, including an incorporated charge pump 306. FIG. 3B shows a conventional charge pump 307 that uses digital regulator 110 as a charge pump power source.

In some implementations, RFID tag 300 includes tuned antenna circuitry 304, full wave bridge rectifier circuitry 308, bypass capacitor 310 and digital regulator 312. Rails 316, 318 provide voltage signals ac1, ac2. Rail 320 provides a voltage source for use by analog circuits in RFID tag 300. Rail 322 provides a regulated voltage source generated by digital regulator 312 for use by digital circuits in RFID tag 300.

By comparing FIGS. 3A and 3B, one can see that the charge pump 307 (FIG. 3B) is conventionally coupled to an output of digital regulator 312 and receives power from digital regulator 312. In FIG. 3A, however, the charge pump 306 has been incorporated into the RFID tag 300, between the tuned antenna circuitry 304 and the full wave, bridge rectifier 308. The charge pump 306 is coupled to rails 316, 318, and receives the two-phase clock (i.e., voltage signals ac1, ac2), which is provided on rails 316, 318. Note that charge pump 307 shown in FIG. 3B receives a clock input from a clock generator input 324.

A conventional charge pump often requires many stages due to a low starting voltage. The charge pump also requires multi-phase clock generators that drive the switches for charge pump operation. Several drivers per pump stage are used to charge pump capacitors. A charge pump can generally increase voltage by an amount less than the DC supply minus the switch threshold. As the voltage in each pump stage increases, the thresholds increase, further reducing the charge pump efficiency. A trend in RFID designs is to lower the digital supply voltage to reduce power consumption for increased read/write range. The lower digital supply voltage makes the charge pump less efficient and increases the differences between nonvolatile memory read and write operational ranges.

Referring again to FIG. 3A, the RFID tag 300 has charge pump 306 incorporated between the high voltage rails 316, 318, which provide voltage signals ac1, ac2. The voltage signals ac1, ac2, act as both a pump clock and starting voltage. The voltage signals ac1, ac2, are not DC signals, but are full wave rectified voltage signals. The voltage of charge pump 306 does not depend on a digital supply level, dvdd, as does charge pump 307. Thus, the circuit configuration shown in FIG. 3A allows voltage scaling for digital circuits (e.g., scaling of dvdd) due to the decoupling of dvdd from the charge pump.

Example RFID Charge Pump Operation

Figure 4:
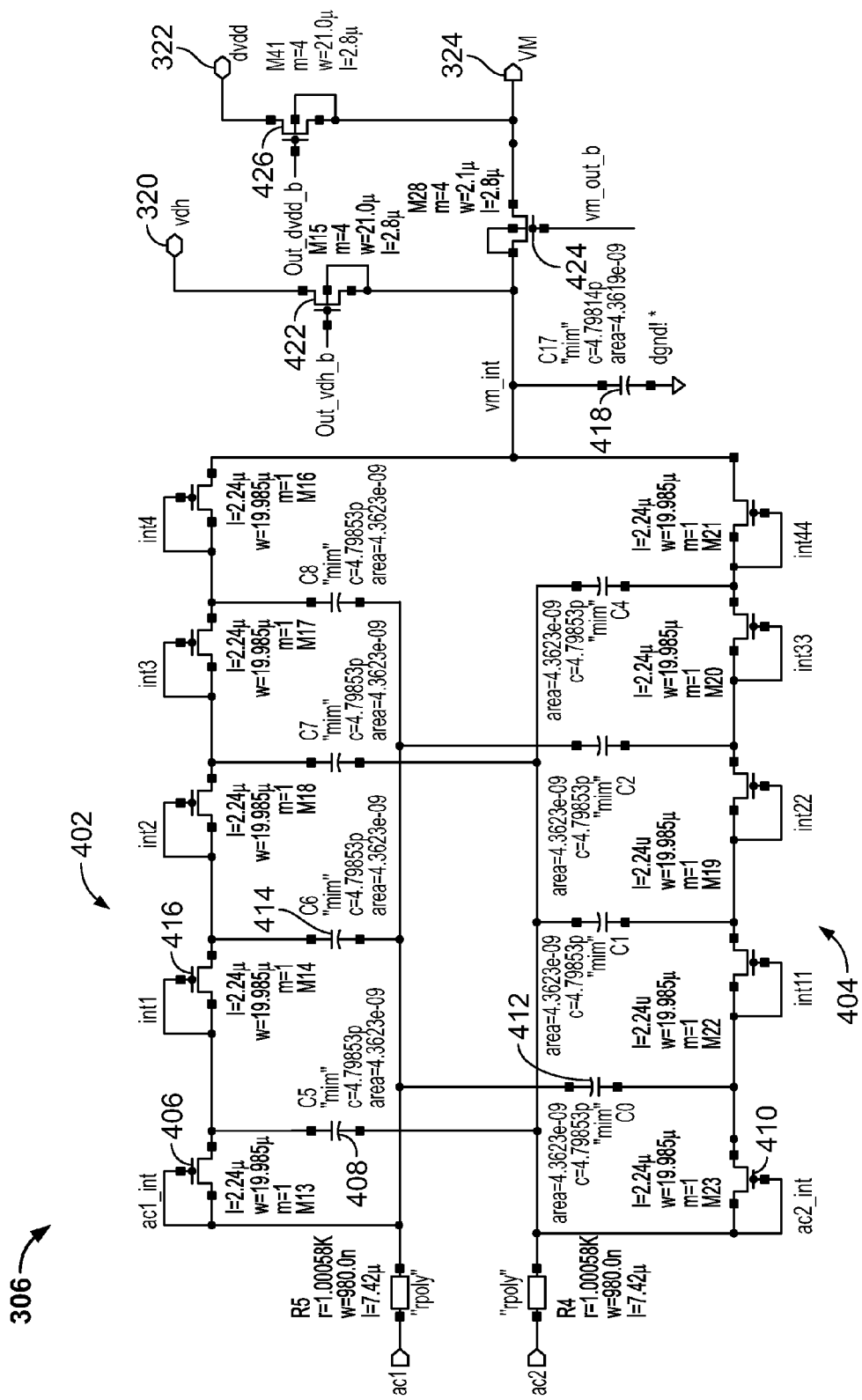
FIG. 4 is a schematic diagram of the charge pump shown in FIG. 3A.

FIG. 4 is a schematic diagram of the charge pump 306 shown in FIG. 3A. The charge pump 306 operates by charging pump capacitors to voltages, then switching the pump capacitors to sum the capacitor voltages. The resulting output voltage is higher than the starting or reference voltage. This high voltage can be used to set up non-volatile memory for erase/write operations. Most charge pumps are enabled or disabled by controlling a pump clock. The example charge pump configuration shown in FIG. 4 is clocked by the voltage signals ac1 and ac2. The pump high voltage, VM, is disabled by connecting the pump output to the vdh signal (e.g., provided by rail 320 in FIG. 3A). The pump high voltage, VM, is enabled by disconnecting the vdh signal.

The example charge pump circuit 400 includes a number of pump stages. Each pump stage includes a switch (e.g., a transistor) and a pump capacitor. The voltage signals ac1, ac2, provide a two phase pump clock to upper and lower branches 402, 404 of the charge pump 306. The two phase pump clock activates and deactivates the switches to charge the pump capacitors and to sum the capacitor voltages to the pump high voltage, VM. VM can be applied to erase/write circuitry of non-volatile memory (not shown). VM is stored across capacitor 418 (C17). Switches 422 (M15), 424 (M28), 426 (M41), control the connection and disconnection of voltage sources, vdh, VM and dvdd, respectively based on control signals, out_vdh_b, vm_out_b and out_dvdd_b.

Figure 5:
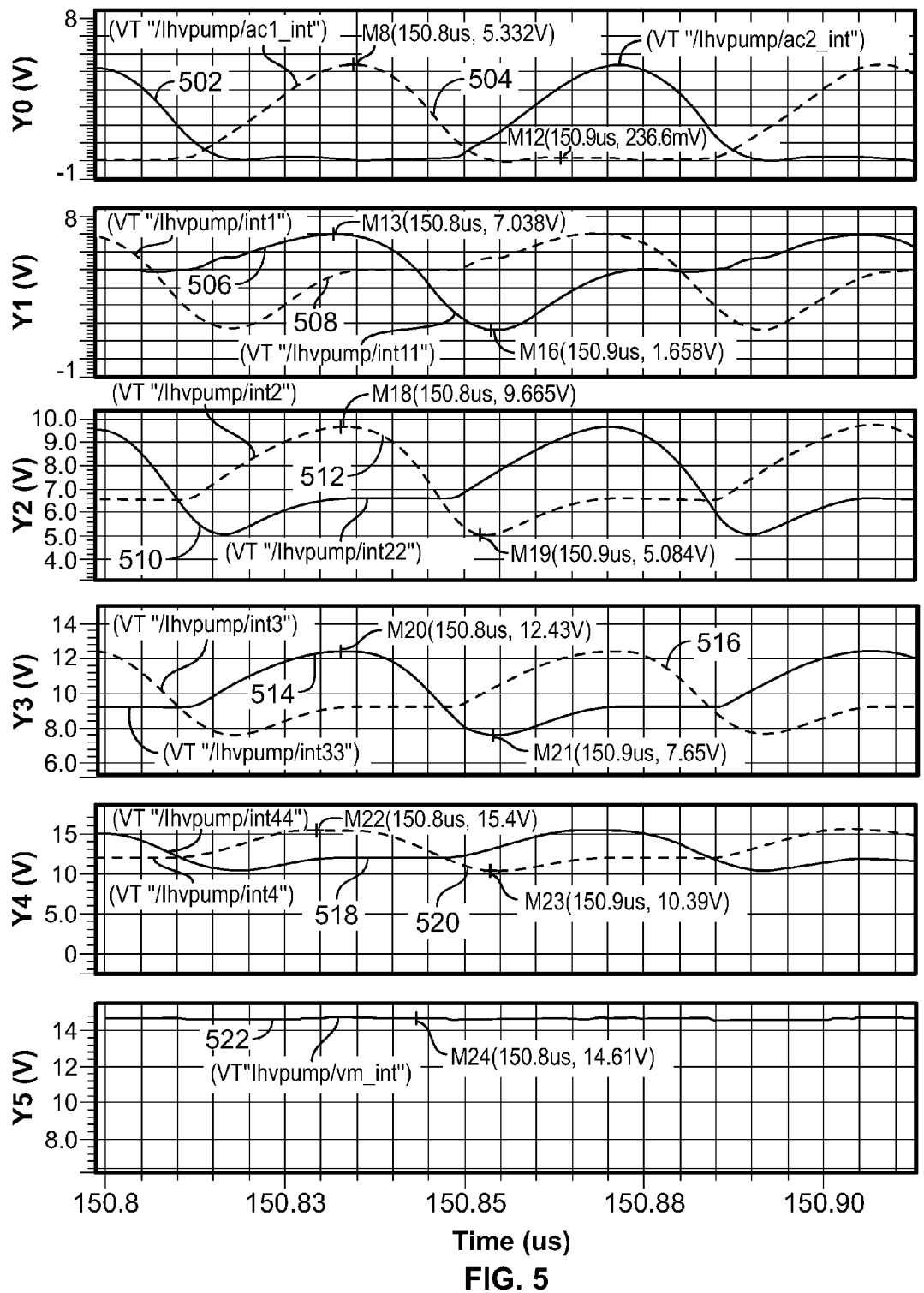
FIG. 5 shows plots illustrating charge pump enabled stage signals.

FIG. 5 shows plots illustrating steady state charge pump signals for a high voltage enabled case. Referring to FIG. 4 and FIG. 5, the plot for charge pump signal, ac1, is labeled 502 and the plot for charge pump signal, ac2, is labeled 504. The plots for the signals at the nodes of the first stage of the charge pump 306 are labeled 506 (int11) and 508 (int1). The plots for the signals at the nodes of the second stage of the charge pump 306 are 510 (int22) and 512 (int2). The plots for the signals at the nodes of the third stage of the charge pump 306 are 514 (int33) and 516 (int3). The plots for the signals at the nodes of the fourth stage of the charge pump 306 are 518 (int44) and 520 (int4). The signal at the output of the charge pump 306 is 522 (vm_int).

Referring to FIG. 5 and to the left side of circuit 400 (near the ac1, ac2 inputs), starting at a time when the voltage at ac1 is high and ac2 is low, transistor 406 (M13) charges capacitor 408 (C5) to the voltage on ac1 less a diode forward voltage. A half period later, ac1 is low and ac2 is high. Transistor 410 (M23) charges capacitor 412 (C0) to voltage ac2. Transistor 406 turns off since ac1 is now low. The voltage on capacitor 408 is now added to the voltage on ac2. This voltage charges capacitor 414 (C6) through transistor 416 (M14). This cycle repeats for each pump stage in circuit 400. The signals generated from both phases (ac1 and ac2) are combined at capacitor 418 (C17). The charge pump voltage open circuit voltage is controlled by the number of transistor/capacitor stages. The charge pump current sourcing capacity is controlled by the pump capacitance. The number of transistor/capacitor stages can be symmetric on the ac1 and ac2 phases to present an equal load to each phase.

The high voltage signal VM shown in FIG. 5 may be limited to the desired EEPROM programming voltage by conventional circuitry not shown.

Figure 6:
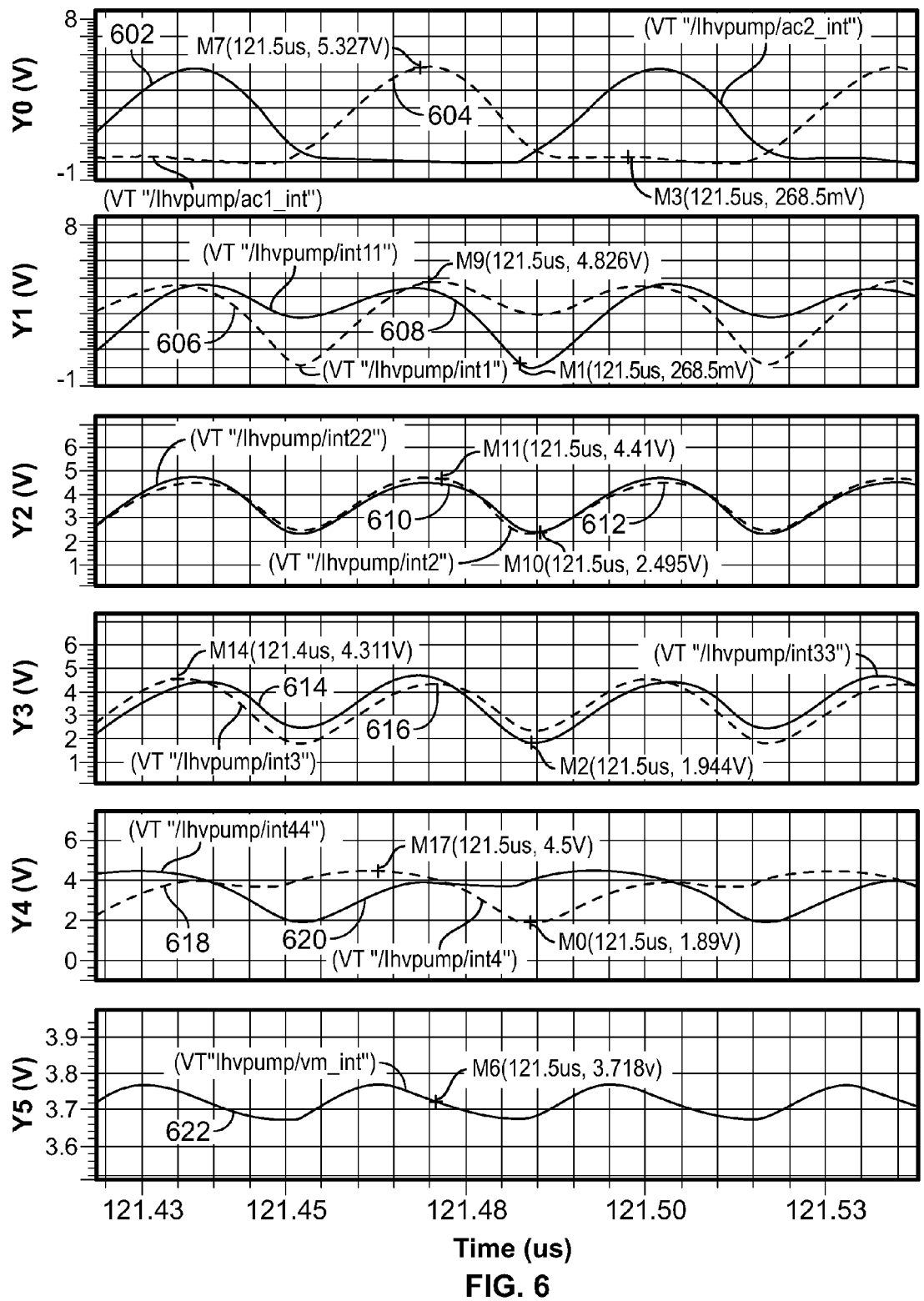
FIG. 6 shows plots illustrating charge pump disabled stage signals.

FIG. 6 shows plots illustrating charge pump disabled stage signals for the high voltage disabled case. The plot for charge pump signal, ac1, is labeled 604 and the plot for charge pump signal, ac2, is labeled 602. The plots for the signals at the nodes of the first stage of the charge pump 306 are labeled 606 (int1) and 608 (int11). The plots for the signals at the nodes of the second stage of the charge pump 306 are 610 (int22) and 612 (int2). The plots for the signals at the nodes of the third stage of the charge pump 306 are 614 (int33) and 616 (int3). The plots for the signals at the nodes of the fourth stage of the charge pump 306 are 618 (int4) and 620 (int44). The signal at the output of the charge pump 306 is 622 (vm_int).

The purpose of the disabled state is to hold the internal pump voltages to a safe level for continuous operation while leaving most of the load on the antenna. The charge cycle is the same as the previous case. The first stage is driven by the 5.5V ac1/ac2 signals. The low impedance vdh source clamps the final stage voltage at capacitor 418 to about 3.7V. The next to last stages at int4 and int44 are clamped to a diode drop above vdh, or 4.5V. The intermediate stages are transferring more charge and discharging further than the high voltage case, such that these stages can only overcome the diode voltage and maintain about 4.5V.

The current sourced into vdh is not wasted. The normal path for current into vdh is through the rectifier diodes (D0-D3). When the charge pump is disabled, a small fraction of the rectifier current reaches vdh through the charge pump. When the charge pump is enabled, the current into vdh from the charge pump is stopped.

In conventional RFID tags, transients caused by enabling the typical RFID charge pump can occur. Conventional designs utilize a "reserve" current sink that approximates the load that would be presented by a conventional charge pump. At the same time that the charge pump is enabled, the reserve current would be disabled, thus reducing the transient. Therefore, the conventional RFID tag must dissipate current whether the charge pump is on or off. This additional load will cause a voltage drop which can cause a low voltage reset at marginal operating fields. This limits the operating range of the conventional RFID tag.

By contrast, the RFID tag 300 shown in FIG. 3A has a very small turn-on transient since all stages are cycled continuously, the pump is always connected to the antenna, and there are no clock drivers or driver stages consuming power.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A circuit comprising:
    antenna circuitry configured for receiving a radio frequency signal;
    charge pump circuitry coupled to the antenna circuitry, the charge pump circuitry configured for using voltage signals output by the antenna circuitry to generate a pump voltage;
    voltage conversion circuitry coupled to the antenna circuitry and operable for converting a varying magnetic field produced in the antenna circuitry to a first voltage source; and
    a digital voltage regulator coupled to the voltage conversion circuitry and configured to provide a second, regulated voltage source using the first voltage source.

2. The circuit of claim 1, where an output of the charge pump circuitry is coupled to the first voltage source.

3. The circuit of claim 1, where the charge pump circuitry further comprises:
    a number of pump capacitors; and
    a number of switches coupled to the pump capacitors, the switches configurable for summing voltages stored on the pump capacitors to generate the pump voltage.

4. The circuit of claim 1, further comprising:
    non-volatile memory circuitry coupled to the charge pump circuitry and configured to receive the pump voltage.

5. The circuit of claim 1, where the antenna circuitry is tuned.

6. The circuit of claim 1, where the voltage conversion circuitry includes power rectifier circuitry.

7. The circuit of claim 6, where the power rectifier circuitry comprises:
    a full wave bridge rectifier; and
    a bypass capacitor coupled to an output of the full wave bridge rectifier.

8. The circuit of claim 1, where the charge pump circuitry uses the signals as a starting voltage and a two phase pump clock.

* * * * *